United States Patent [19]

Foreman

[11] Patent Number: 5,341,593
[45] Date of Patent: Aug. 30, 1994

[54] PLANT SUPPORT

[76] Inventor: Howard R. Foreman, Rte. 1, Box 184, Miami, Okla. 74354

[21] Appl. No.: 18,779

[22] Filed: Feb. 17, 1993

[51] Int. Cl.⁵ .............................................. A01G 17/06
[52] U.S. Cl. ..................................................... 47/47
[58] Field of Search ...................................... 47/47, 45

[56] References Cited

U.S. PATENT DOCUMENTS

| | | | |
|---|---|---|---|
| 1,556,373 | 10/1925 | Thoeni | 47/475 |
| 1,587,740 | 6/1926 | Wiswell . | |
| 3,731,429 | 5/1973 | Orthman | 47/47 |
| 4,519,162 | 5/1985 | Stuckey | 47/47 |
| 4,534,129 | 8/1985 | Stuckey | 47/47 |
| 4,703,584 | 11/1987 | Chazalnoel | 47/47 |

FOREIGN PATENT DOCUMENTS

| | | | |
|---|---|---|---|
| 2905551 | 8/1980 | Fed. Rep. of Germany | 47/47 |
| 928909 | 6/1963 | United Kingdom | 47/47 |

Primary Examiner—Henry E. Raduazo
Attorney, Agent, or Firm—Catalano, Zingerman & McKay

[57] ABSTRACT

A small spring steel stake is used to support a large tomato plant. The plant is held close to the stake so that the stake supports the plant with its weight pulling substantially straight down along the axis of the stake. Rings are optionally used to support only the branches and not the stem of the plant. Since the tomatoes grow close to the stem, a heavy load of tomatoes adds little weight to the rings. A shade, designed to be installed whenever the gardener decides the time is right, is detachably mounted to the top of the plant support and consists of spaced apart shade members so that rain water captured by the shade members may be directed to the roots of the plant.

An optional deck planter adapted to secure the stake in its vertical position facilitates the use of the plant support for urban and even indoor gardening conditions.

20 Claims, 4 Drawing Sheets

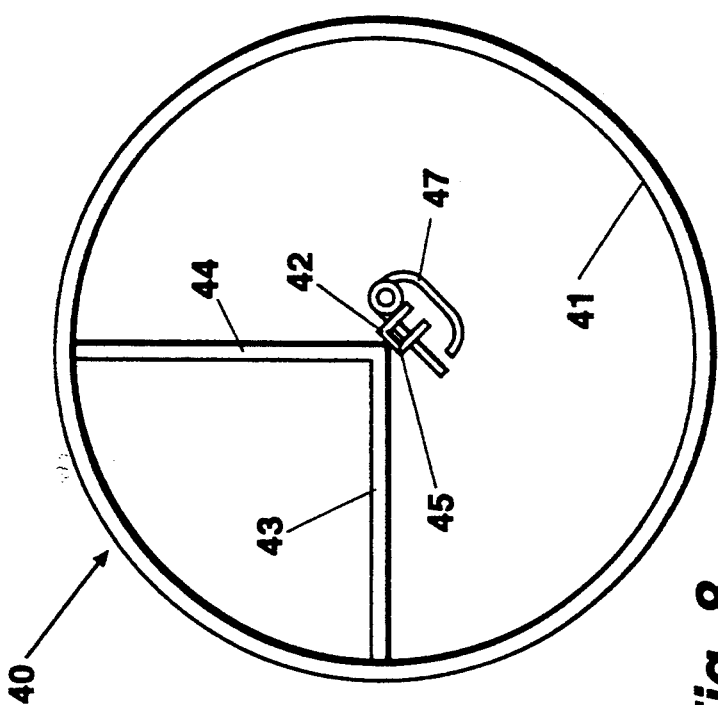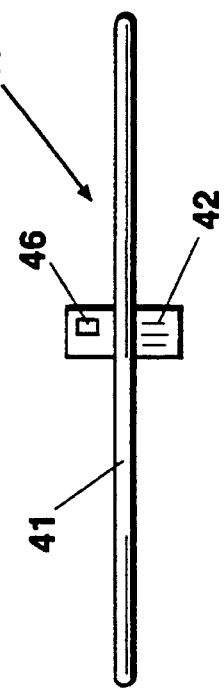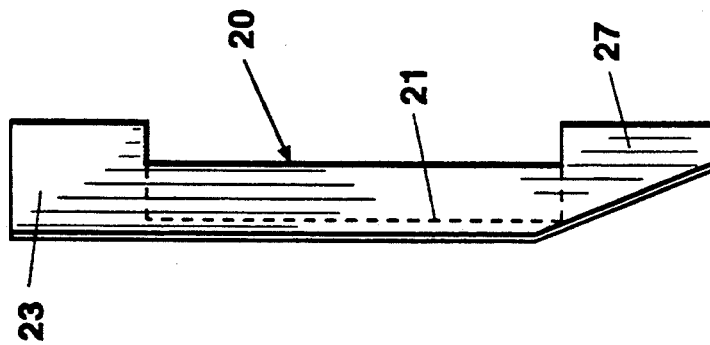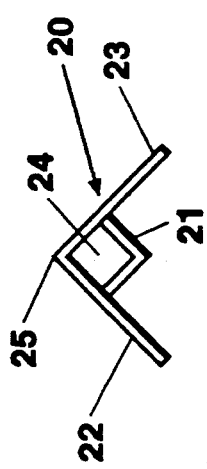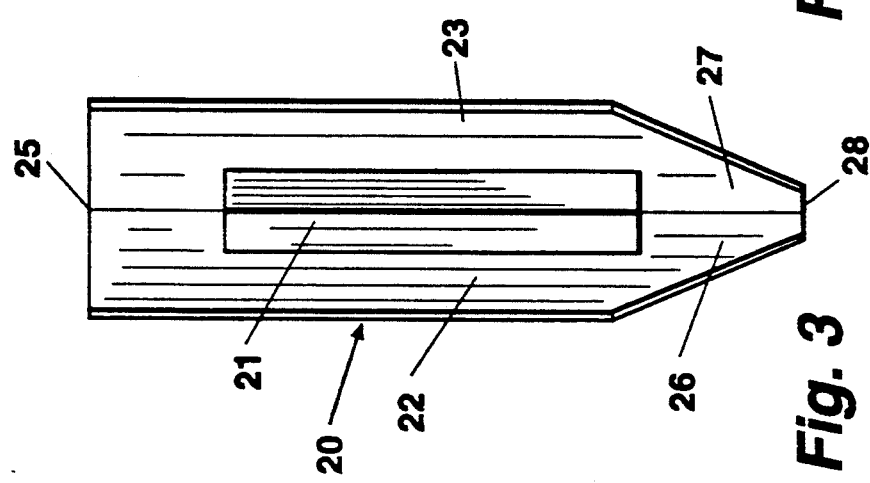

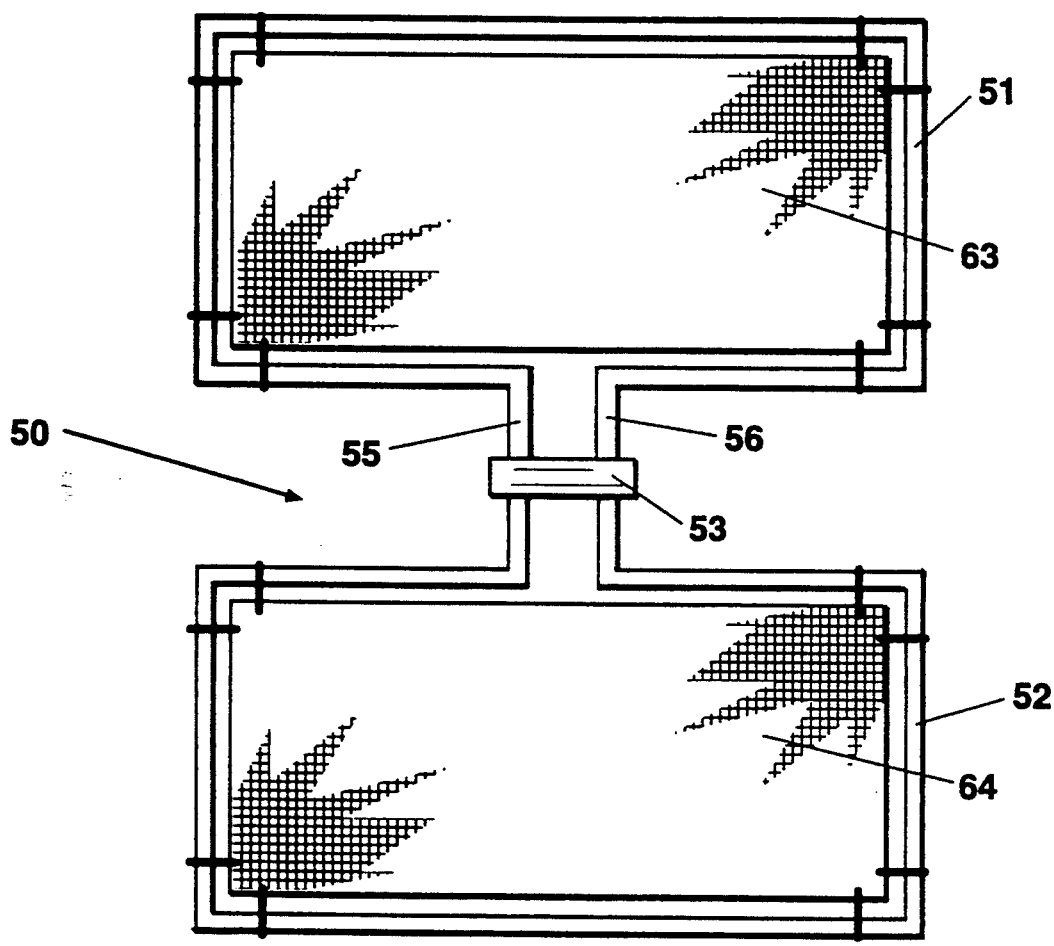
Fig. 10
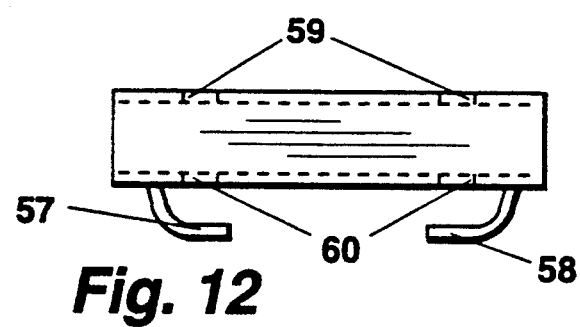
Fig. 12
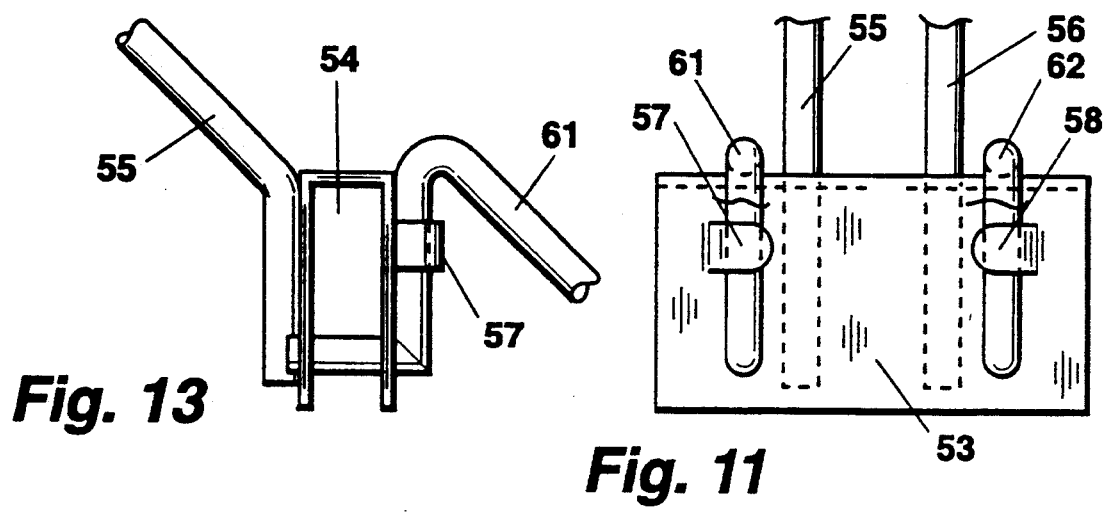
Fig. 13          Fig. 11

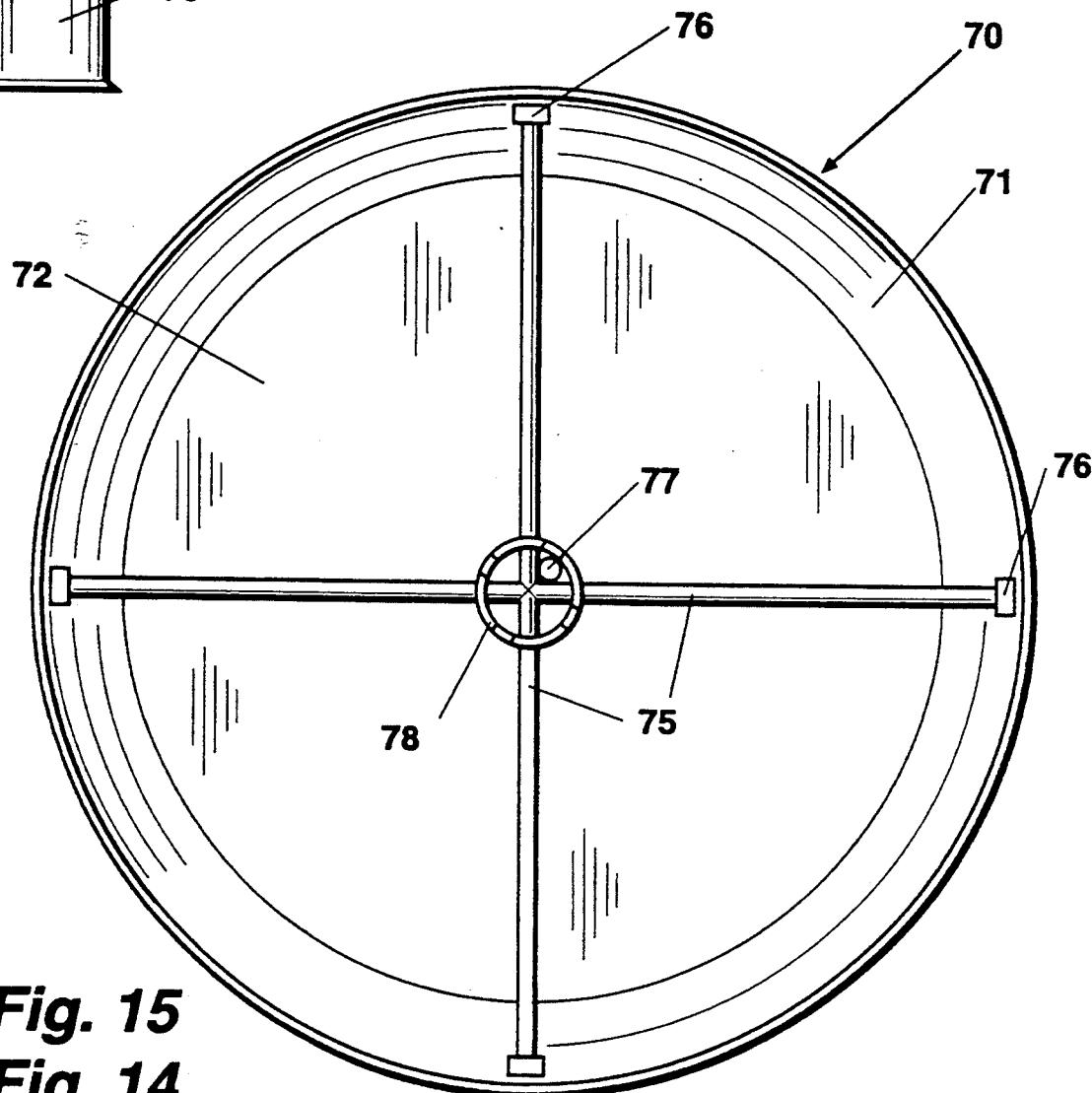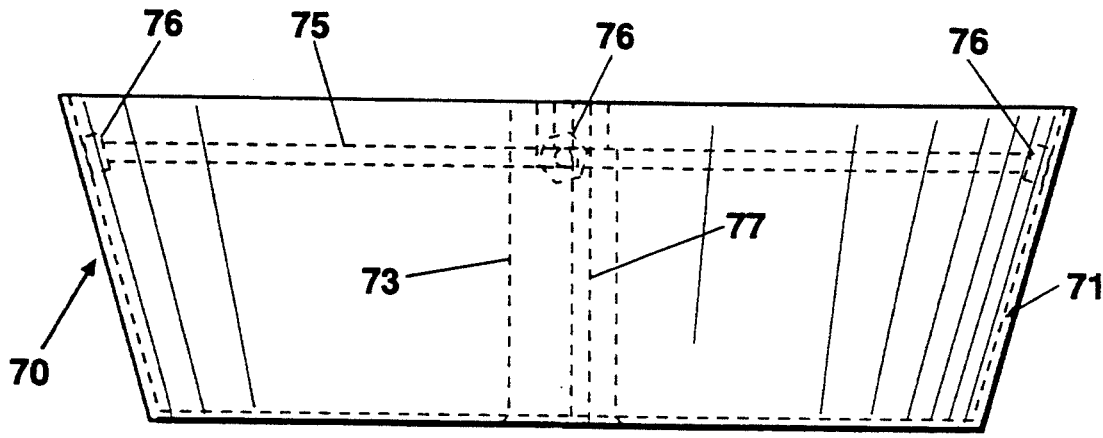

5,341,593

PLANT SUPPORT

BACKGROUND OF THE INVENTION

This invention relates generally to gardening accessories and more particularly concerns supports for long stemmed plants such as tomato plants and the like.

Proper support will increase a tomato plant's production and, in many cases, help the plant last until frost. Furthermore, in addition to proper support, a tomato plant needs full sun for maximum growth early or until about the time of first harvest. After this time, full sun causes sunspots and cracks on the tomatoes. Few gardeners raise less than 8 tomato plants and many raise 24 or more. Each plant needs its own support. Known plant supports, such as those described by Stuckey in U.S. Pat. Nos. 4,519,162 and 4,534,129, Orthman in U.S. Pat. No. 3,731,429 and Riswell in U.S. Pat. No. 1,587,740, use rings supported on one side only by a stake. To offset the leverage applied to the unsupported side of the ring where both the plant stem and branches lean, heavy, clumsy and expensive stakes and rings are required. The number of supports required makes their use too expensive for the average gardener. Furthermore, none of the known plant supports makes any provision whatsoever for temporary shading of the supported plant.

It is, therefore, an object of this invention to provide an inexpensive plant support. It is another object of this invention to provide a plant support which is easy to assemble. Another object of this invention is to provide a plant support which flexes with the wind. A collateral object of this invention is to provide a plant support which is lightweight. It is also an object of this invention to provide a plant support adapted to secure a temporary shade over the plant. A further object of this invention is to provide a plant support adapted to direct rainwater to the roots of the supported plant. Another object of this invention is to provide a plant support that is easily anchored in the ground. Alternatively, it is an object of this invention to provide a plant support which may be anchored in a deck planter.

SUMMARY OF THE INVENTION

In accordance with this invention, a small spring steel stake is used to support a large tomato plant. The plant is held close to the stake so that the stake supports the plant with the weight of the plant pulling substantially downwardly along the axis of the stake. Rings connectable at selected intervals along the stake are optionally used to support only the branches and not the stem of the plant. Since the tomatoes grow close to the stem, a heavy load of tomatoes adds little weight to the rings.

A shade, designed to be installed whenever the gardener decides the time is right, is detachably mounted to the top of the plant support and consists of spaced apart shade members which will not only block the sun but also direct rain water captured by the shade members to the roots of the plant.

An optional deck planter adapted to secure the stake in its vertical position facilitates the use of the plant support in urban and even indoor gardening conditions.

BRIEF DESCRIPTION OF THE DRAWINGS

Other objects and advantages of the invention will become apparent upon reading the following detailed description and upon reference to the drawings in which:

FIG. 3 is a front elevation view of a preferred embodiment of a sliding anchor for the plant support of FIG. 1;

FIG. 4 is a side elevation view of the sliding anchor of FIG. 3;

FIG. 5 is a top plan view of the anchor of FIG. 3;

FIG. 8 is a top plan view of a preferred embodiment of the optional branch support rings of the plant support of FIG. 1;

FIG. 9 is a side elevation view of the rings of FIG. 8;

FIG. 10 is a top plan view of a preferred embodiment of the shade assembly of the plant support of FIG. 1;

FIG. 11 is a side elevation view of the bracket portion of the assembly of FIG. 10;

FIG. 12 is a top plan view of the bracket of the assembly of FIG. 10;

FIG. 13 is a front elevation view of the bracket portion of the assembly of FIG. 10;

FIG. 14 is a front elevation view of a preferred embodiment of a deck planter for use with the plant support of FIG. 1;

FIG. 15 is a top plan view of the deck planter of FIG. 14; and

FIG. 16 is a side elevation view of a preferred embodiment of the anchor of the deck planter of FIG. 14.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 1:
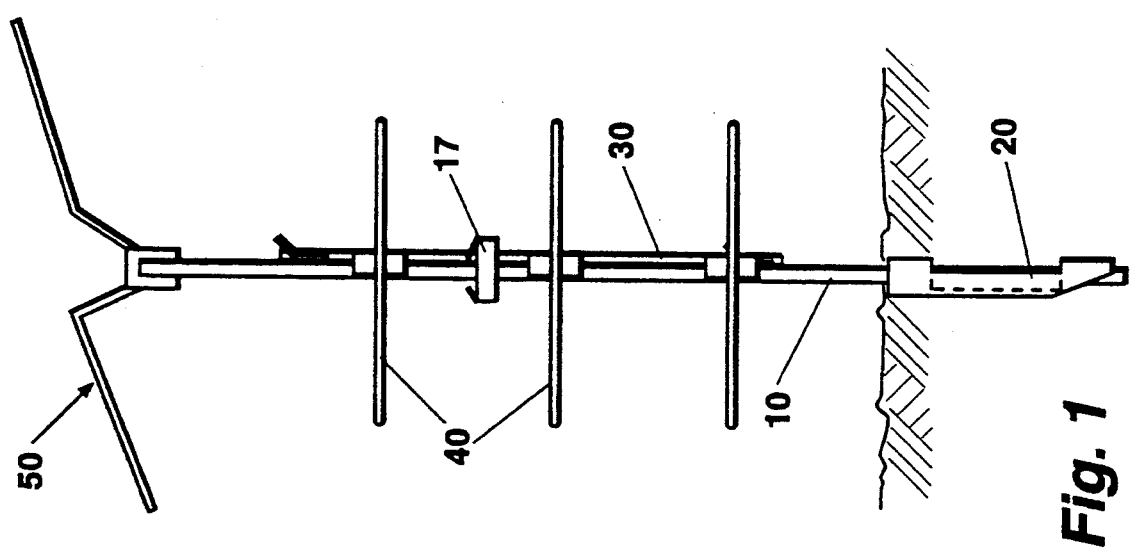
FIG. 1 is a front elevation view of a preferred embodiment of the plant support.

A preferred embodiment of a plant support is illustrated in FIG. 1. The plant support consists essentially of a stake 10, a sliding anchor 20 at the base of the stake 10, a stay 30 suspended adjacent the stake 10, a plurality of rings 40 spaced in substantially horizontal planes concentrically about the stake 10 and a shade assembly 50 which may be optionally or temporarily connected to the upper end of the stake 10.

Figure 2:
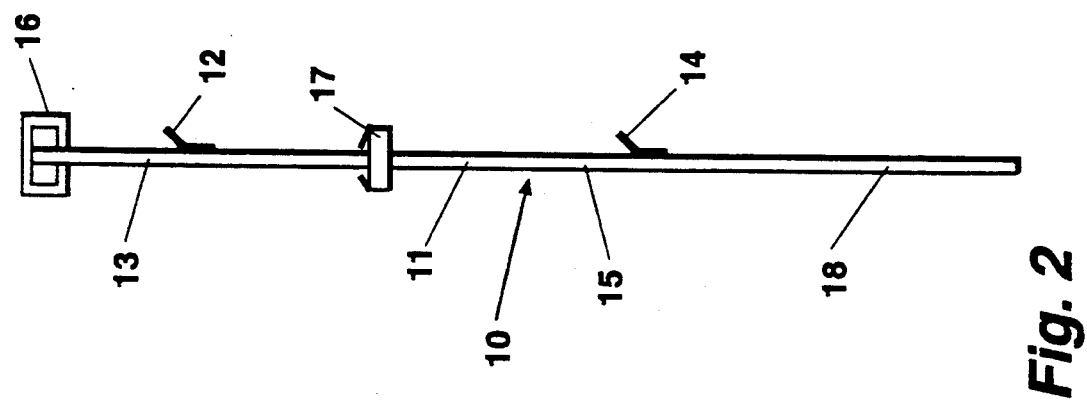
FIG. 2 is an elevation view of a preferred embodiment of the stake of the plant support of FIG. 1.

The stake 10 is illustrated in FIG. 2 and consists of an elongated rod 11, preferably round but of any cross-section. The rod 11 may be of metal, plastic or any other suitable material, provided it is sufficiently rigid to support the weight of the plant when that weight is concentrated along the axis of the rod and is also sufficiently flexible to bend in response to the force of the wind on the supported plant. When used to support tomato plants, the rod 11 will be approximately six foot in length and approximately one-quarter to one-half inch in diameter. In the preferred embodiment shown, the rod 11 has a stay peg or hook 12 angled upwardly from its upper portion 13 and a locking peg 14 or hook proximate its mid portion 15. Preferably, the upper end of the rod 11 terminates in a loop 16 which defines a male coupler or vertically aligned flat tongue for reasons to be hereinafter set forth. Finally, in the preferred embodiment, a stay ring 17 is slidably disposed on the rod 11 between the stay peg 12 and the locking peg 14, also for reasons to be hereinafter explained.

The sliding anchor 20 is illustrated in FIGS. 3, 4 and 5 and is preferably formed from a section of angle iron having a mid portion 21 inwardly bent between the side faces 22 and 23 to define a channel 24 proximate the apex 25 of the angle iron. The lower portions 26 and 27 of the side faces 22 and 23 are cut at an angle so as to taper toward a lower point 28 on the bottom of the anchor. The dimension of the channel 24 is such as to slidably but somewhat snugly receive the lower portion 18 of the stake 10 through the channel 24, as is seen in FIG. 1.

Figure 7:
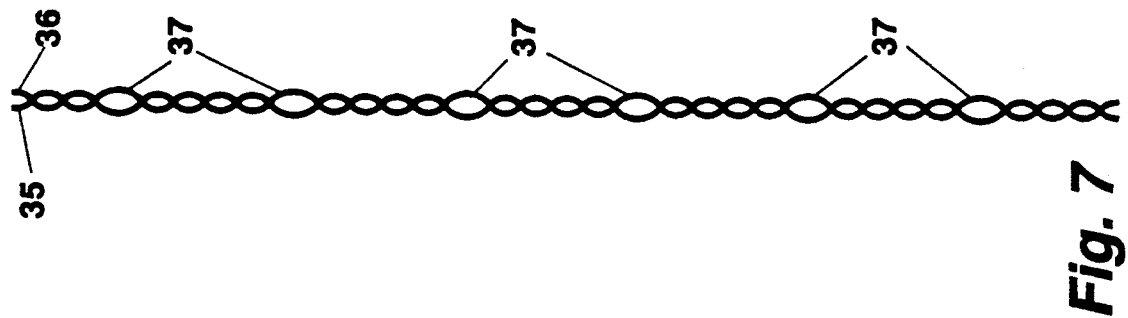
FIG. 7 is a front elevation view of another embodiment of the stay of the plant support of FIG. 1.
Figure 6:
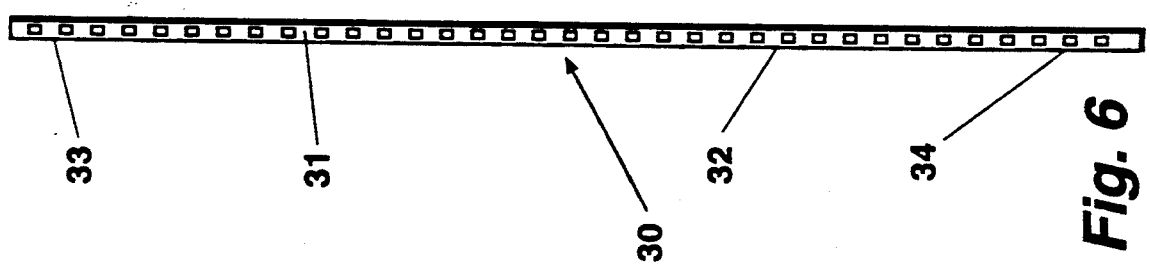
FIG. 6 is a front elevation view of one embodiment of the stay of the plant support of FIG. 1.

The stay 30 is illustrated in FIG. 6 and consists essentially of an elongated strip of material 31 having a plurality of apertures 32 spaced along its length. The length of the stay 30 is less than the length of the stake 10 so that, as seen in FIG. 1, the stay 30 can be suspended from the stay peg 12 on the stake 10 with the upper end 33 of the stay 30 below the top of the stake 10 and the lower end 34 of the stay 30 above the ground G into which the stake 10 is inserted. As seen in FIG. 1, when the stay 30 is fed through the stay ring 17, one of the apertures 32 engages with the stay peg 12 to suspend the stay 30 from the upper portion 13 of the stake 10. With the stay 30 thus suspended, a second aperture 32 receives the locking peg 14 to hold the stay 30 in juxtaposition along the stake 10. The stay ring 17 is then lowered into close proximity to the locking peg 14 to secure the stay 30 in its position on the locking peg 14. The stay 30 may alternatively be formed by two twisted strands of wire 35 and 36 having the twists spaced at intervals to provide the apertures 37 along the length of the stay 30, as is illustrated in FIG. 7.

Turning now to FIGS. 8 and 9, the optional rings 40 for use with the plant support are illustrated. Each ring 40 consists of a substantially circular loop of wire 41 concentrically connected to and about a bracket 42 by a pair of radial arms 43 and 44. The bracket 42 is essentially of U-shaped cross-section so as to slidably receive and grip the stake 10 against its interior surfaces 45 so as to maintain the wire loop 41 in a substantially horizontal condition when the bracket 42 is mounted on the vertical stake 10. Apertures 46 are aligned through the arms of the bracket 42 so that one end of a spring pin ring 47 can be inserted through the bracket apertures 46 and through one of the apertures 32 or 37 in the stay 30. The extension of the spring pin ring 47 through the bracket apertures 46 locks the wire loop 41 in its substantially horizontal condition while the extension of the spring pin ring through the stay aperture 32 or 37 positions the wire loop 41 at its desired vertical level along the stake 10. The spring pin ring 47 resiliently flexes to engage with itself to define a closed loop closely girding the stem of the plant. As shown in FIG. 1, any number of rings 40 can be similarly connected at selected vertical spacing along the stake 10.

The shade assembly 50 is illustrated in FIGS. 10 through 13. In the preferred embodiment of the shade assembly 50, a pair of rectangular wire loops 51 and 52 are joined in spaced apart relationship by a bracket 53 which defines an inner groove or female coupler 54 into which the loop or tongue 16 of the stake will be snugly inserted to secure the shade assembly 50 in its position atop the stake 10. One wire loop 51 has legs 55 and 56 which are welded to one side of the bracket 53. The other side of the bracket 53 is preferably provided with spaced apart flanges 57 and 58 extending above pairs of apertures 59 and 60 spaced apart and aligned on both sides of the bracket 53. Thus, with the bracket 53 mounted on the loop 16 of the stake 10, the legs 61 and 62 of the second wire loop 52 can be squeezed together, inserted into the apertures 59 and 60 and released within the flanges 57 and 58 to secure the second wire loop 52 in place on the bracket 53. As can best be seen in FIG. 13, the legs 55, 56, 61 and 62 are bent in relation to their respective wire loops 51 and 52 so as to provide the desired angular relationship of the planes defined by the wire loops 51 and 52 to the ground. Rectangular shade members 63 and 64 may be secured to the wire loops 51 and 52 in any desired fashion so as to provide the desired shade for the plant.

Turning now to FIGS. 14, 15 and 16, the deck planter 70 for use with the plant support is illustrated. The deck planter 70 consists preferably of a typical inverted truncated conical planter box having side walls 71 and a base 72. Extending upwardly from the center of the base is an anchor 73 consisting of a tubular member extending approximately the full height of the planter 70. Preferably, the anchor 73 has four L-shaped slots 74 spaced at ninety degree intervals. A pair of cross members 75 at right angles to each other extend diametrically across the planter 70 when seated in the anchor slots 74. Once seated, the cross members 75 are rotated in the lower portion of the L-shaped slots 74 to lock the cross members to the anchor 73 and to secure the upper portion of the anchor 73 in its position within the planter 70. As shown, in the preferred embodiment, the free ends of the cross members 75 will rest within U-shaped seats 76 on the inside walls of the deck planter 70 when they have been rotated into their locked position in the anchor 73. Finally, a second tubular member 77 extends vertically within the anchor 73 so as to be aligned within one quadrant of the anchor 73 when the cross members 75 have been rotated into their locked position. Thus, the stake 10 can be inserted at its lower end into the tubular member 77 which supports the stake in its vertical position and further prevents the cross members 75 from rotating out of the locked position in the anchor 73. A reinforcing ring 78 may also be welded or otherwise fastened to the cross members 75 to secure their stability.

To use the plant support in the normal gardening environment, the gardener vertically aligns the stake 10 adjacent the stem of the plant with the sliding anchor 20 disposed on the lower portion 18 of the stake 10. The stake 10 is then penetrated into the ground to a satisfactory depth to support the stake and the plant. The sliding anchor 20 is then penetrated into the ground to secure the stake 10 in this position. With the stake 10 thus vertically mounted adjacent the stem of the plant, the stay 30 is suspended from the stake 10 by inserting the lower end 34 of the stay 30 through the stay ring 17 on the stake 10 and sliding an upper stay aperture 32 onto the stake stay peg 12. The stay ring 17 is then lowered as close as possible to the stake locking peg 14 to secure the stay 30 in place on the stake 10. With the stay 30 thus mounted, for young plants having little branch weight, the stem of the plant may be secured at one or more locations vertically along the stake 10 by the use of the spring pin rings 47 alone. That is, the spring pin rings 47 may be inserted through selected ones of the stay apertures 32 and clipped around the plant stem to secure the plant stem in position in relation to the stake 10. However, as the branches of the plant grow and the branch weight increases, it may become desirable to use one or more of the branch support rings 40. In this case, each ring 40 is lowered over the top of the stake 10 to its desired level on the stake 10 and its ring bracket 42 snugly engaged with the stake 10. The snug engagement of the bracket 42 with the stake 10 will secure the ring 40 in a substantially horizontal relationship. A spring pin ring 47 can then be inserted through the appropriate stay aperture 32 at the desired level of the ring 40 and also through the apertures 46 in the ring bracket 42. The spring pin ring 47 is then looped around the stem of the plant and secured to itself to maintain the stem in proper relationship along the stake 10. The branches of the plant may then be draped over the ring 40 so as to distribute the weight of the branches around the stake 10. As the plant grows, additional rings 40 can be added to the support. During the early growing season, the shade assembly 50 will not be used. When the gardener deems shade to be desirable, the shade assembly bracket 53 is slipped over the loop or tongue 16 at the top of the stake 10 thus securing one of the wire loops 51 and shade members 63 in position over the plant. The legs 61 and 62 of the second wire loop 52 and shade member 64 are then inserted into the flanges 57 and 58 and apertures 59 and 60 as hereinbefore described to secure the second shade member in place and also to lock the entire shade assembly in its position atop the stake 10. The spaced apart relationship of the shade members 63 and 64 allows the rainwater collected by the shade members 63 and 64 to be directed toward the root of the plant. The final position of the shade members 63 and 64 can of course be adjusted by the gardener by bending the legs 55, 56, 61 and 62 to any desired angle in relation to the horizontal.

While the stake 10 is lightweight and inexpensive, it will flex with the force of the wind so as not to break or be uprooted from the ground G in which it is supported.

Finally, when used with a deck planter 70, the deck planter assembly including the anchor 73 and the cross members 75 are secured together as hereinbefore described and the stake 10, with the sliding anchor 20 removed is inserted into the tubular member 77 to support the stake 10 in its vertical position. The remainder of the plant support is then assembled as hereinbefore described.

Thus, it is apparent that there has been provided, in accordance with the invention, a plant support that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A support for a plant comprising:
 a resiliently flexible elongated member having a lower end adapted for penetration into the ground proximate the base of the plant for positioning and maintaining said member substantially vertically adjacent the stem of the plant;
 an elongated member having a plurality of apertures spaced therealong;
 means fixed proximate an upper end of said resiliently flexible member for suspending said apertured member therefrom; and
 a plurality of means, each one engaged with a different one of said apertures, for releasably closely girding the stem of the plant.

2. A support according to claim 3 further comprising means disposed on said resiliently flexible member and adapted for penetration into the ground to anchor said resiliently flexible member therein.

3. A support according to claim 4, said anchoring means being slidably disposed on and independently penetrable into the ground in relation to said resiliently flexible member.

4. A support according to claim 3, said suspending means comprising a hook extending upwardly through an upper aperture of said apertured member.

5. A support according to claim 1 further comprising means for securing a lower portion of said apertured member to said resiliently flexible member.

6. A support according to claim 5, said securing means comprising a hook fixed to a lower portion of said resiliently flexible member and extending upwardly through an upper aperture of said apertured member.

7. A support according to claim 5, said securing means comprising a ring slidably disposed around said resiliently flexible and said apertured members.

8. A support according to claim 1, said securing means comprising:
 a hook fixed to a lower portion of said resiliently flexible member and extending upwardly through an upper aperture of said apertured member; and
 a ring slidably disposed around said resiliently flexible and said apertured members above said hook to lock said hook in said upper aperture.

9. A support according to claim 1 further comprising means radially extending from said resiliently flexible member for supporting at least one branch of the plant.

10. A support according to claim 9, said branch supporting member comprising:
 a ring of radius substantially equal to a desired spacing of the stem of the plant from downwardly drooping portions of branches thereof;
 means fixed to said ring and engagable with said resiliently flexible member for supporting said ring substantially concentrically about and at a selected plane transverse to said resiliently flexible member.

11. A support according to claim 10, said means fixed to said ring comprising;
 a U-shaped bracket having side walls snugly slidably onto and gripping said resiliently flexible member therebetween;
 at least one rigid radial arm connecting said bracket and said ring;
 at least one aperture through an extending portion of said bracket; and
 means removably inserted through said at least one bracket aperture and a selected one of said apertures in said apertured member.

12. A support according to claim 9 further comprising a plurality of means spaced apart along and radially extending from said resiliently flexible member for supporting at least one branch of the plant.

13. A support according to claim 1, each of said girding means comprising a spring pin having one portion insertable in its respective aperture and another portion resiliently flexible to encircle the stem and engage with said one portion to secure the stem therein.

14. A support according to claim 1 further comprising:
- a substantially flat means for shading the plant from the sun;
- first coupling means fixed on an upper end of said resiliently flexible member; and
- second coupling means fixed to said shading means and cooperable with said first coupling means to mount said shading means atop said resiliently flexible member and to secure said shading means against rotation relative thereto.

15. A support according to claim 14, said shading means having an opening approximately above the stem of the plant and being slightly sloped to direct rainwater collected on said shading means therethrough.

16. A support according to claim 1 further comprising:
- a pair of substantially flat means for shading the plant from the sun;
- a male coupler fixed on an upper end of said resiliently flexible member; and
- a female coupler fixing said shading means in spaced apart relationship in approximately horizontal planes and cooperable with said male coupler to secure said shading means atop said resiliently flexible member and against rotation relative thereto with said shading means on diametrically opposite sides of said resiliently flexible member and at least one of said shading means being slightly sloped to direct rainwater collected thereon between said shading means.

17. A support according to claim 1 further comprising a planter for holding earth in which the plant is disposed, said planter having an opening disposed approximately centrally in a bottom thereof through which said lower end of said resiliently flexible member extends.

18. A support according to claim 1 further comprising:
- a planter having side walls and a bottom; and
- a tube fixed in relation to and extending vertically upwardly from said bottom approximately centrally between said side walls for receiving said lower end of said resiliently flexible member therein.

19. A support according to claim 1 further comprising:
- a planter having side walls and a bottom;
- a large diameter tube fixed in relation to and extending vertically upwardly from said bottom approximately centrally between said side walls to an upper end having a plurality of angularly displaced topwardly accessible L-shaped slots therein;
- a plurality of radial arms fixed together at a point of origin and angularly displaced to be seated and rotated in said slots; and
- a small diameter tube fixed vertically within one of said angular segments and extending upwardly to a point beneath said seated arms for locking said arms in said slots and for receiving said lower end of said resiliently flexible member therein.

20. A support according to claim 19 further comprising a plurality seats angularly displaced along said side walls for supporting a radial end of each of said arms thereon.

* * * * *